INVENTOR
FREDERICK MERRILL VARNEY,
BY
ATTORNEY.

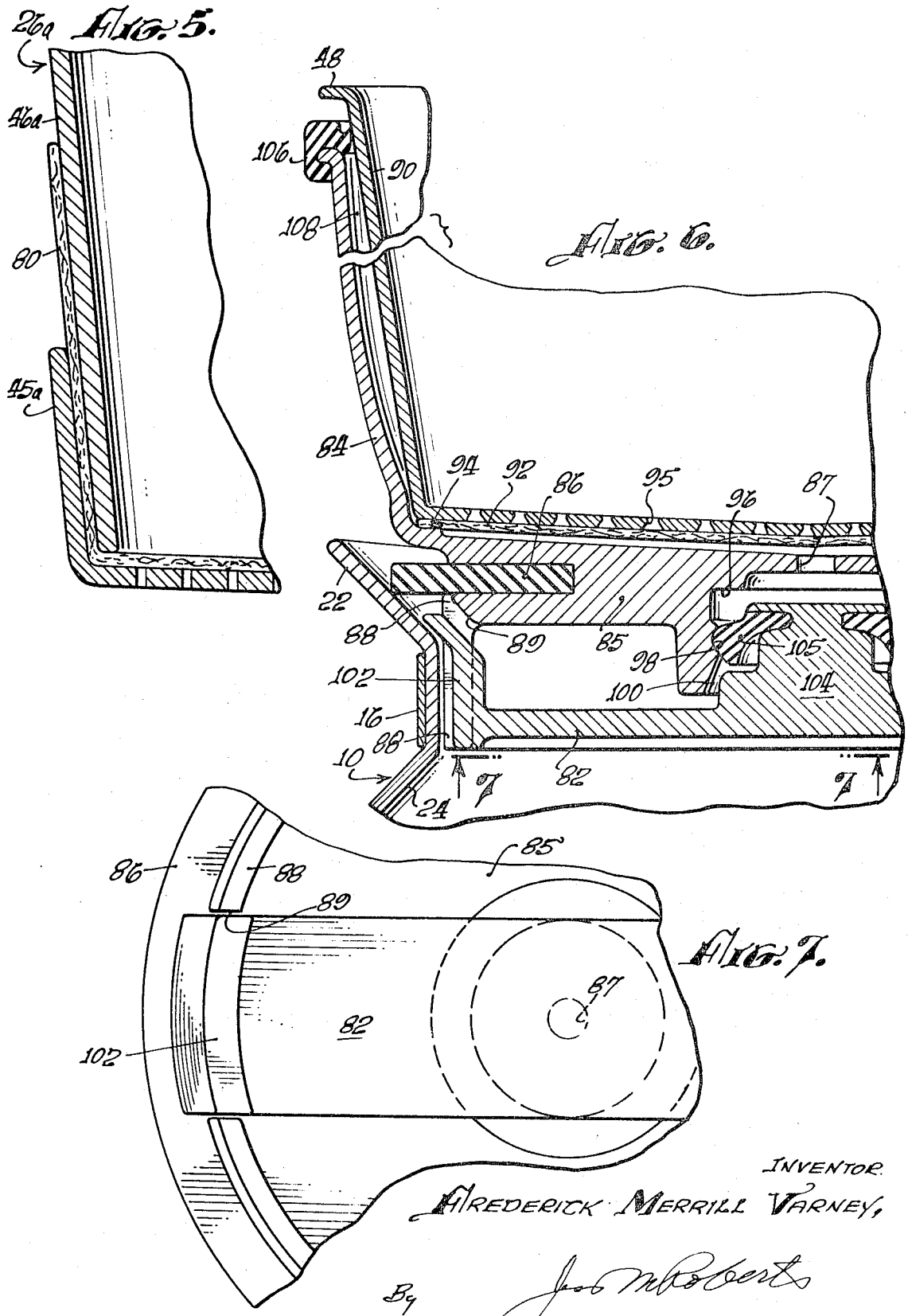

3,618,510
Patented Nov. 9, 1971

3,618,510
INFUSION APPARATUS
Frederick Merrill Varney, 3036 Platten Drive,
Fairfax, Va. 22030
Filed Mar. 11, 1970, Ser. No. 18,503
Int. Cl. A47j *31/043*
U.S. Cl. 99—302                                         39 Claims

ABSTRACT OF THE DISCLOSURE

A filter-equipped brewing receptacle containing heated water and ground coffee seats on a boiler receptacle in which the water has been heated and when the coffee is brewed to the desired degree, steam in the boiler receptacle is condensed to create a vacuum to draw the brew through the filter and through an initially closed valve into the lower boiler receptacle. The brewing receptacle is made in two separate sections one of which is manually movable downward to open the valve to start the filtration step. The movable section may be an auxiliary container in the brewing receptacle or the bowl of the brewing receptacle may be movable relative to a brewing bowl base.

BACKGROUND OF THE INVENTION

The present invention is directed to certain needs for improvement in the type of coffee maker that is disclosed in Varney et al. Pats. 2,401,529 and 2,621,581 and in Varney Pat. 3,060,836 which prior disclosures are hereby incorporated into the present disclosure by reference.

One of the needs for improvement relates to controlling the duration of the brewing period. In the three Varney disclosures the flow of the filtrate from the upper brewing receptacle into the lower boiler receptacle that terminates the brewing period is initiated solely by the rise in the vaccum-created pressure differential between the two receptacles and since a number of factors are involved in the rise of the pressure differential, the duration of the brewing step may vary widely and be either too short or too long to suit the taste of a particular user. The need is for close control of the duration of the brewing period, i.e. close control of the initiation of the filtration step and minimum duration of the filtration cycle consistent with very high grade filtering.

Another need for improvement is for reliable sealing means to minimize possibility of atmospheric air leaking into the boiler receptacle to spoil the vacuum and thus prevent termination of the brewing period with consequent ruining of the brew.

Still another need for improvement is to make it easier to clean the apparatus after a brewing cycle in preparation for a subsequent brewing cycle. It is especially important to make the surfaces of all parts of the apparatus readily and fully accessible for cleaning operation.

A further need is to provide such a coffee maker with a disposable filter. The disposable filter should be inexpensive and should be easily and quickly installed and should be such as to contain conveniently the spent solids removed from the brew by filtration.

SUMMARY OF THE INVENTION

The brewing receptacle which has a filter-equipped inner container for the hot water and ground coffee is made in two separate sections one of which is manually movable downward from a normal upper position to a lower position. After a time period for a brewing operation, initiation of flow communication between the brewing receptacle and the lower boiler receptacle to initiate a filtration step and thus terminate the brewing step is controlled by an initially closed valve which opens in response to manual downward movement of the movable section of the brewing receptacle from its normal first position to its second position. In one embodiment of the invention the movable section of the brewing receptacle is a filter-equipped separate container inside the bowl of the brewing receptacle. In a second embodiment the movable section is the bowl itself of the brewing receptacle which is manually movable relative to a base portion of the brewing receptacle.

The preferred embodiments of the invention have a first annular sealing means embracing the inner container to seal off the annular space between the container and the brewing receptacle to prevent atmospheric air from bypassing the filter. Suitable provision is made to vent this space to the atmosphere to release any fluid pressure that may tend to occur prior to the filtration step and to permit filtrate to flow freely into the annular space for reasons hereinafter set forth. The seal may also be shaped so as to facilitate breaking the vacuum in the boiler receptacle after the filtration step for releasing the brewing receptacle from the boiler receptacle. Means to secure the annular sealing means in its assembled position may be in the form of a band encircling the brewing receptacle with a handle for the brewing receptacle mounted on the band or it may simply be retained after the manner of a rubber band embracing the brim of the brewing receptacle and incorporating a sealing portion to embrace the inner container or liner.

A second annular sealing means is effective between the seated brewing receptacle and the boiler receptacle to keep atmospheric air from leaking directly into the boiler receptacle to spoil the vacuum therein prematurely. This second annular sealing means may have an integral skirt extending into the mouth of the boiler receptacle to prevent the brewing receptacle from jittering or dancing as steam escapes past the seal from the boiler to atmosphere during the steeping cycle. This seal may also be shaped as a means to prevent such jittering, with a portion of its lip causing steam to escape through a localized zone, as hereinafter set forth in detail.

A feature of the invention is that when a vacuum is created in a boiler receptacle by condensation of vapor therein, the consequent pressure differential across the valve tends to open the valve and the valve may be designed to open in response to the rise in the pressure differential to a predetermined magnitude. Thus if the user neglects to open the valve manually the valve will eventuality open automatically. If the user prefers a brewing period of relatively long duration he may purposefully depend on this automatic action, although the moment of initiation of filtration and therefore termination of steeping may be quite indefinite and variable in this case.

A further feature of the preferred embodiments of the invention is that the container in the brewing receptacle, with the filter either secured to it or separate from it, may be disposable; may be made in two parts that partially telescope to cooperate to releasably secure a filter element. The outer part may be cup-shaped with a perforated bottom wall to support or retain the filter element. The inner part may be open at the top and bottom and may engage only an outer circumferential margin of the filter element.

In one embodiment of the invention the lower end of the inner part telescopes into a cup-shaped outer part to clamp the filter element against the bottom wall of the outer part. In another embodiment the filter element has an upwardly extending peripheral wall and the inner telescoping part clamps the peripheral wall of the filter against the inner circumferential surface of the outer telescoping part. If desired the filter element with the upwardly extending peripheral wall may be in the form of a bag or cup similar to the familiar cup cake cup. In all embodiments of the invention the filter element may be disposable and, if desired, the inner of the two telescoping parts may be very inexpensive and therefore also disposable.

A further feature of the invention is that the relative movement between the two sections of the boiler receptacle not only opens the initially closed valve but also creates a pump action to cause positive and forceful injection of liquid that is trapped between the two sections during the steeping operation. Since the injected liquid is cooler than the boiling water and vapor in the boiler receptacle it instantly stops the boiling and lowers the temperature of the vapor within the boiler. The result is substantially instantaneous condensation of the vapor for abrupt initiation of the filtration cycle. Thus the fluid injection eliminates the need for waiting for conduction and radiation of heat through the walls of the boiler to lower the internal temperature enough to condense the steam. This feature makes it practical to use boiler receptacles made of materials of relatively low thermal conductivity, such as glass and ceramics.

The various features and advantages of the invention may be understood by reference to the following detailed description and the accompanying drawings.

BRIEF DESCRIPTION OF THE DRAWINGS

In the drawings, which are to be regarded as merely illustrative:

FIG. 5 is an enlarged fragmentary sectional view showing how two telescoping parts of the container in the brewing receptacle may cooperate to releasably retain a filter element;

FIG. 6 is a fragmentary sectional view of a second embodiment of the invention; and FIG. 7 is a bottom plan view of the base section of the brewing receptacle as seen along the line 7—7 of FIG. 6.

DESCRIPTION OF THE PREFERRED EMBODIMENTS OF THE INVENTION

Figure 1:
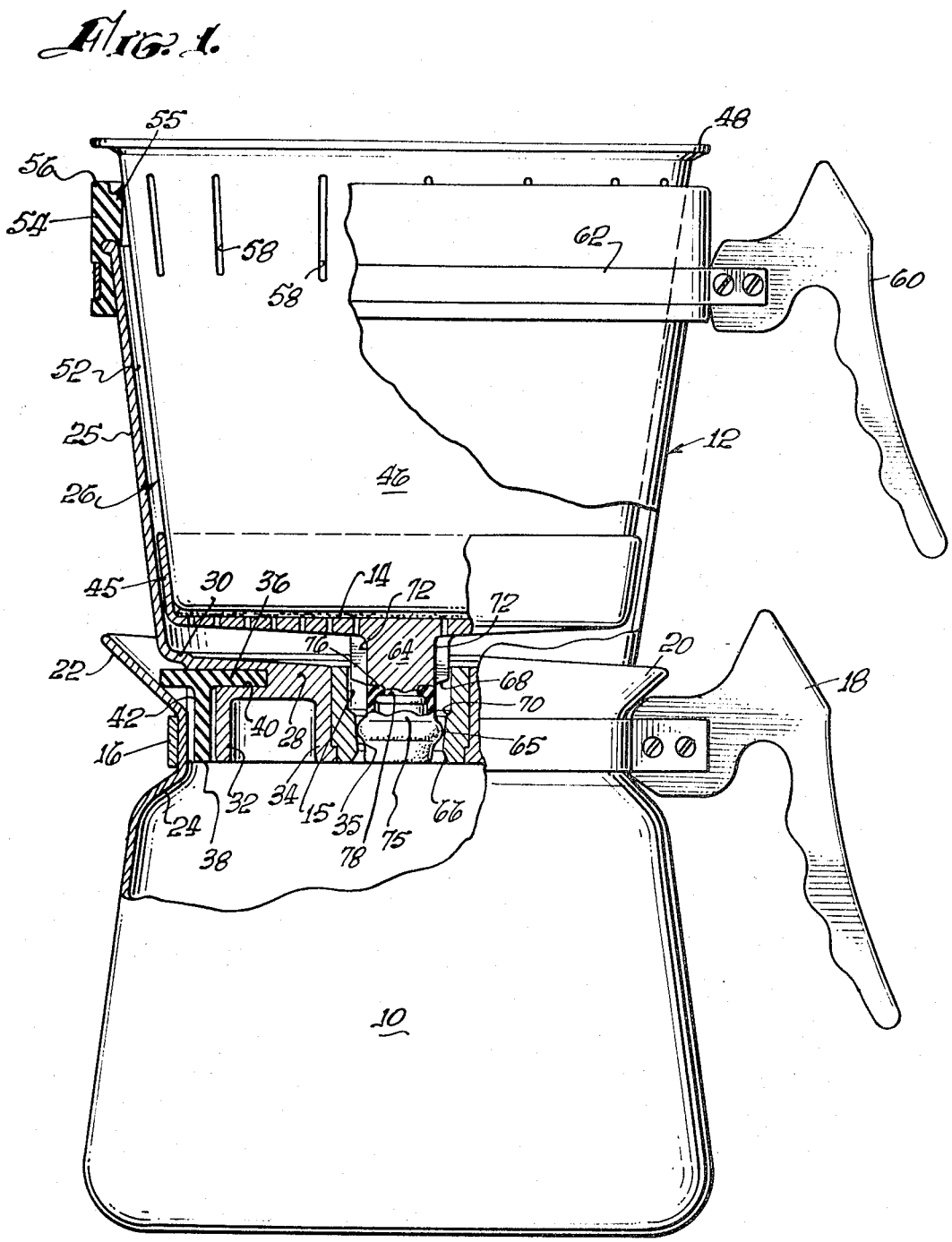
FIG. 1 is a side elevational view partly in cross section of the presently preferred embodiment of the invention.

Referring to the first embodiment of the invention shown in FIGS. 1–5, FIG. 1 shows a lower boiler receptacle 10 and further shows an upper brewing means, generally designated 12, seated on the boiler receptacle, the brewing means incorporating a suitable filter sheet 14 and being provided with a bottom port 15 that is controlled by a valve that will be described hereafter. The structure of the brewing apparatus may best be understood in the light of a brief summary of the operating cycle.

The first step is to fill the boiler receptacle 10 with water and then place it on a suitable burner for the purpose of bringing the water to a boil. The second step is to place granulated coffee in the brewing means 12 on top of the filter sheet 14. With the bottom port 15 closed the third step is to pour boiling water from the boiler receptacle 10 into the brewing means 12 with care to retain a residual quantity of water in the boiler receptacle.

The next step is to seat the brewing means 12 on the boiler receptacle 10 in the manner shown in FIG. 1 with the bottom port 15 still closed to permit the coffee to steep or brew for a short period of time. During this brewing operation the boiler receptacle 10 is again placed on a burner to bring the residual quantity of water therein to a boil and thereby fill the boiler receptacle with steam.

The next step is to remove the assembly from the burner for the purpose of permitting the steam in the boiler receptacle to condense and thereby create a vacuum. The bottom port 15 is then opened for a filtration operation in which the vacuum in the boiler receptacle draws the liquid in the brewing means through the filter sheet 14 and through the bottom port into the boiler receptacle.

The boiler receptacle 10, which may be made of suitable material such as heat-resistant glass, is formed with a neck that is embraced by a metal band 16 which carries a suitable handle 18. Above the neck the boiler receptacle is formed with a flared rim 20 which slopes upward to form a pouring lip 22.

It is to be noted that the circumferential wall of the boiler receptacle tapers upward and that the reduction in diameter at the neck of the boiler receptacle forms an inner circumferential shoulder 24, the purpose of which is to cause a residual quantity of water to be retained in the boiler receptacle when the boiler receptacle is tilted to pouring position. By virtue of the tapering configuration of the boiler receptacle, the boiler receptacle may be tilted even beyond horizontal position in the pouring operation and still retain the desired residual quantity of water.

In all embodiments of the invention, the brewing means 12 is made in two sections which are movable relative to each other and the valve that controls the bottom port 15 of the brewing means is operated by the relative movement between the two sections. In the first embodiment of the invention one of the two separate sections of the brewing means 12 is an outer bowl 25 and the other separate section is an open top inner container 26, the inner container being shown at its initial or normal upper position in FIG. 1 and being movable axially downward to an alternate lower position shown in FIG. 2.

The outer bowl 25 forms the bottom port 15 and has a bottom wall 28 that drains to the bottom port, the bottom wall being formed with an annular ledge 30 to limit the downward movement of the inner container 26 and to provide a drainage space under the inner container when the inner container is at its lower position. The bottom wall 28 of the outer bowl 25 is formed with a cylindrical skirt 32 that is dimensioned to extend into the neck of the boiler receptacle and the bottom wall is further formed with an axial tubular extension 34 which terminates in substantially the same plane as the cylindrical skirt and which forms an inner circumferential valve seat 35, which may be unitary with extension 34 or separate as shown.

Figure 2:
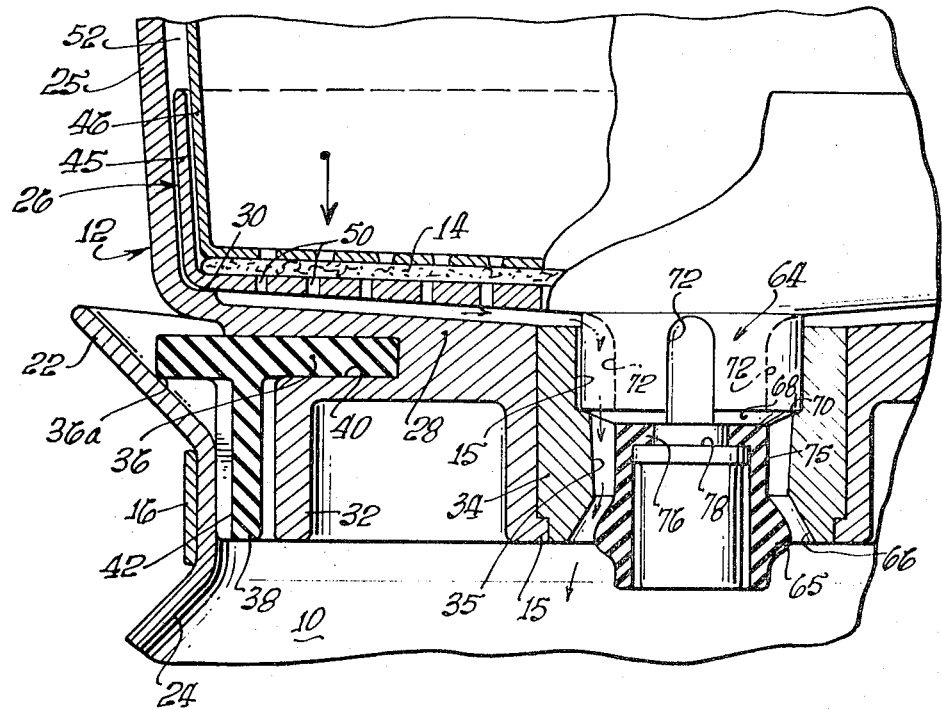
FIG. 2 is a greatly enlarged portion of FIG. 1.

A suitable sealing means is required to seal the juncture between the brewing means 12 and the boiler receptacle 10 during the filtration step when a vacuum exists in the boiler receptacle. In the construction shown, the sealing means comprises a flat elastomeric ring 36 that has an integral cylindrical skirt 38 which is dimensioned to fit into the annular space between the neck of the boiler receptacle and the cylindrical skirt 32 of the outer bowl 25, the flat ring being retained in an outer circumferential slot 40 in the bottom wall 28 of the outer bowl. As shown in FIGS. 1 and 2, the sealing ring 36 seats against the flared rim 20 of the boiler receptacle for the dual purpose of yieldingly supporting the outer bowl 25 and of sealing off the boiler receptacle 10 during the filtration step.

Prior to the filtration step while water is boiling in the boiler receptacle 10, the sealing ring 36 releases steam to the atmosphere, the cylindrical skirt 38 of the sealing ring being formed with at least one outer longitudinal groove 42 for that purpose. It has been found that releasing steam to the atmosphere in this manner tends to cause jiggling of the outer bowl 25 but such jiggling may be prevented by providing that the cylindrical skirt 38 of the sealing ring fits snugly but with sliding engagement in the neck of the boiler receptacle.

When the outer bowl 25 is in its upper position shown in FIG. 1 with no vacuum urging it downward, the sealing ring 36 is flat and rests lightly on the flared rim 20 and yields to permit steam to escape from the interior of the boiler receptacle. When the inner container 26 is forced downward ether manually or by a vacuum to the lower position shown in FIG. 2, the downward pressure is transmitted to the outer cup 25 and forces the sealing ring 36 downward with consequent flexing of the sealing ring for effective sealing action. If a vacuum exists in the boiler receptacle 10, the consequent pressure differential between the atmosphere and the vacuum keeps the sealing ring flexed to keep the seal effective.

Figure 3:
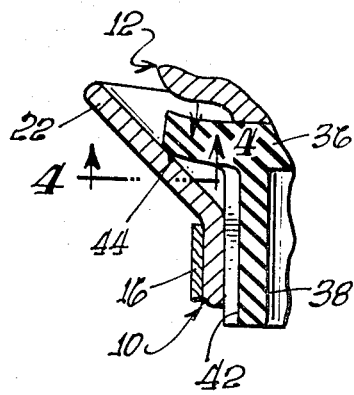
FIG. 3 is a fragmentary sectional view of a modified sealing ring.
Figure 4:
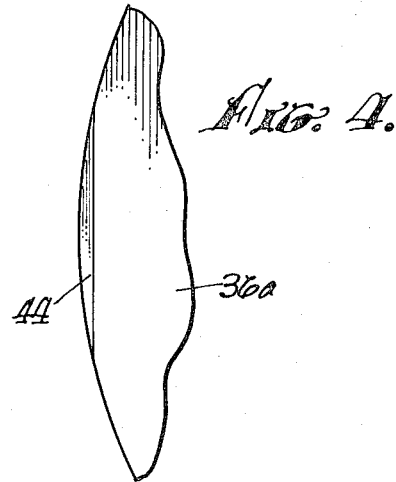
FIG. 4 is a fragmentary bottom plan view of the modified sealing ring as seen along the line 4—4 of FIG. 3.

FIGS. 3 and 4 illustrate a modification of the invention wherein a sealing ring 36a is similar to the sealing ring 36 but differs in having a porton cut away to provide a recess 44 which provides a path of least resistance for steam to escape to the atmosphere from the boiler receptacle. Normally the whole surface of the recess 44 makes face-to-face contact wth the flared rim 20 of the boiler receptacle to cut off the communication with the atmosphere. When, however, steam is being generated in the boiler receptacle to create a pressure differential across the path of least resistance for steam escape, then the recessed portion 44 opens to permit steady, stable flow of generated steam.

Turning again to FIGS. 1 and 2, the inner container 26 comprises a lower shallow cup 45 and a tapered circumferential shell 46 which is open at its lower end which telescopes into the cup in a substantially fluid-tight manner. The shell 46 is formed with an upper rim 48 to serve as a handle for manual depression of the inner container 26. The previously mentioned circular filter sheet 14 is interposed between the bottom rim of the shell 46 and the bottom of the cup 45 and may be bonded to the shell if desired. The filter sheet alone may be a disposable filter sheet or both the filter sheet and the shell 46 may be disposable with or without the filter sheet being bonded to the shell. The bottom wall of the cup 45, which is the bottom wall of the inner container 26, is formed with numerous perforations 50 to permit flow of filtrate from the inner container into the space between the underside of the inner container and the bottom wall 28 of the outer bowl 25.

As shown in FIG. 1, the outer diameter of the inner container 26 is apprecibaly smaller than the inside diameter of the outer bowl 25 to provide an annular space 52 which should be vented to the atmosphere during the brewing step but must be cut off from the atmosphere during the filtration step. For the purpose of cutting off the annular space from the atmosphere, a suitable elastomeric sealing ring 54 is formed with a circumferential slot to embrace the rim of the outer bowl 25 in a fluid-tight manner and the sealing ring is formed with a tapered sealing lip 55 for sealing engagement with the shell 46 of the inner container 26. Preferably the sealing ring 54 is further provided with an upwardly extending rounded flange 56 to serve as a finger piece to permit the sealing ring to be manually distorted to vent the annular space 52 whenever desired.

A feature of this particular embodiment of the invention is the concept of providing the outer peripheral surface of the shell 46 with a series of short longitudinal grooves 58 which normally register with the sealing lip 55 of the sealing ring 54 when the inner container 26 is in its upper position shown in FIG. 1. Since the inner container 26 is in its upper position during the brewing operation, the grooves 58 vent the annular space 52 to the atmosphere during the brewing operation, but when the inner container is manually depressed to its second lower position to terminate the brewing operation, the grooves 58 shift below the sealing lip 55 and thus cut off the annular space from the atmosphere.

The outer bowl 25 of the brewing means is provided with a suitable handle 60 that is secured by an encircling metal band 62. In this particular embodiment of the invention the metal band 62 embraces the lower part of the sealing ring 54 and thus serves the further purpose of clamping the sealing ring against the outer surface of the bowl 25.

The valve that normally closes the bottom port 15 of the brewing means comprises the previously mentioned valve seat 35 and a cooperating valve member 64 that is an axial extension of the bottom wall of the inner container 26. The valve member 64 which is integral with the cup 45 has a circumferential elastomeric bead 65 of the character of an O-ring that makes sealing contact with the valve seat 35 and the frictional resistance to downward movement of the valve member from its closed position shown in FIG. 1 is sufficient to support the inner container 26 at its initial upper position shown in FIG. 1. In this regard it is to be noted that the valve seat 35 is slightly tapered downward to insure adequate resistance to downward movement of the valve member.

Below the valve seat 35, the tubular extension 34 of the bottom wall of the outer bowl 25 flares as indicated at 66 so that urging the valve member downward to shift the bead 65 out of the valve seat results in continued opening movement of the valve member with a snap action. At the fully open position of the valve member 64 shown in FIG. 2, an outer circumferential shoulder 68 of the valve member abuts an inner circumferential shoulder 70 of the tubular extension 34. Longitudinal grooves 72 in the valve member 64 which cut through the shoulder 68 permit the filtrate to flow past the two abutting shoulders.

Preferably the tubular extension 34 of the bottom wall of the outer bowl 25 is provided with a low friction liner 34 of Teflon or the like which forms the valve seat 35 and preferably the valve member 64 is embraced by a replaceable elastomeric sleeve 75 as shown in FIG. 2 which forms the bead 65, the sleeve having an inner radial flange 76 which releasably engages a circumferential shoulder 78 of the valve member.

A feature of the invention is that when the valve member 64 is in its lower open position shown in FIG. 2 it protrudes below the plane of the lower edge of the skirt 32 of the bottom wall of the outer bowl 25, whereas when the valve member is in its closed position shown in FIG. 1 the lower end of the valve member is flush with that plane. By virtue of this construction, the valve member 64 may be shifted from its open position to its closed position by simply forcing the brewing means downward against a suitable support surface such as the surface of a counter or table until the skirt 32 rests on the support surface.

The manner in which the described apparatus may be manipulated to carry out the operating cycle may be readily understood from the foregoing description.

While the water is being brought to a boil in the boiler receptacle 10, the operator sets the brewing means 12 on a flat support surface, places the filter sheet 14 in the cup 45 and pushes the shell 46 of the inner container 26 down into the cup to hold the filter sheet. If at this time the valve member 64 is in its lower open position at which it protrudes below the skirt 32 of the outer bowl 25 downward manual pressure on the shell 46 causes the underlying flat support surface to retract the valve member upward to its normal closed position shown in FIG. 1. The operator puts dry granular coffee onto the filter sheet 14 in the inner container 26 and then pours boiling water from the boiler receptacle 10 into the inner container, but holds back a residual quantity of water in the boiler receptacle.

The operator then places the boiler receptacle 10 back onto the burner to bring the residual water to a boil and seats the brewing means 12 on the boiler receptacle in the manner shown in FIG. 1 to carry out the brewing operation. During the brewing operation the operator stirs the coffee in the inner container 26 for a minute or so for the best extraction. The brewing operation may be extended to 2½ to 3½ minutes for best flavor, according to taste.

During the brewing operation, a small volume of dilute coffee dribbles through the filter 14 and accumulates in the space under the inner container 26 and since the annular space 52 is vented to the atmosphere by the grooves 58, the liquid rises in the annular space to the level of the liquid inside the inner container. The venting of the annular space 52 also permits the liquid in the annular space to expand and displace air into the atmosphere. If the venting grooves 58 were omitted, the expansion of the air in the annular space 52 would tend either to push the filter upward and away from the cup 45, or tend to lift the whole inner container 26.

To terminate the brewing operation, the operator either turns off the burner or removes the assembly from the burner to stop the generation of steam and then pushes down on the inner container 26, i.e. pushes down the rim 48 of the shell 46 to move the valve member 64 downward and thus open the valve for free flow of filtrate from the brewing means through the bottom port 15 into the boiler receptacle 10. During the initial downward movement of the inner container 26 the contraction of the space under the inner container displaces air to the atmosphere through the vent grooves 58. Further downward movement of the inner container, however, cuts off the vent grooves 58 to trap the liquid between the inner container and the outer bowl 25 and the continued final downward movement of the inner container continues the contraction of the space under the inner container so that the downwardly moving inner container functions, in effect, as a piston to displace the trapped liquid in a positive manner downward through the port 15 into the interior of the boiler receptacle. Thus as the valve snaps to its open position a substantial quantity of filtrate is injected or sprayed into the interior of the boiler receptacle to cause immediate condensation of the steam in the boiler receptacle with the consequent formation of a vacuum. By virtue of the vacuum, the liquid infusion above the filter 14 is drawn rapidly through the filter 14 and through the perforations 50 into the boiler receptacle through the open bottom port 15. The piston-like action of the inner container 26 may cause some momentary reverse flow upward through the filter sheet 14 but the primary consequence is the spraying of the liquid filtrate into the interior of the boiler receptacle.

The vacuum in the boiler receptacle 10 continues beyond the completion of the filtering step to cause air to pass slowly down through the filter into the boiler receptacle and eventually the pressure in the boiler receptacle equalizes with the atmosphere to make it possible to lift the brewing means away from the boiler receptacle. To avoid waiting until the pressure in the boiler receptacle rises to atmospheric pressure, the operator may break the seal between the shell 46 and the outer bowl 25 by manipulating the upper sealing ring 54 by means of its flange 56 to break the upper seal and thus permit atmospheric air to reach the interior of the boiler receptacle through the annular space 52. If desired, the upper seal may be broken by simply flexing the shell 46 inward by finger pressure instead of by distorting the sealing ring 54. The operator may then remove the brewing means from the boiler receptacle to permit the boiler receptacle to be used to serve the brewed coffee.

If the filter sheet 14 is united with the shell 46, the shell and liner with the coffee grounds carried thereby may be simply discarded to be replaced by a new shell and united filter for the next brewing operation. If the shell 46 is not intended to be discarded, the filter 14 may be discarded and replaced after the spent coffee grounds are rinsed out of the inner container. With the valve open, water will flow freely through the bottom port 15 to make it possible to rinse out the brewing means.

It is also to be noted that, if desired, the valve member 64 may be manually pushed upward into the interior of the outer bowl 25 to free the cup 45 and make it possible to remove the cup for a washing operation. This procedure makes it possible to empty the spent coffee grounds from the inner container in a simple and expeditious manner.

If the filter sheet 14 is permanently bonded to the shell 46 and the combination of shell and filter sheet is reusable, it is a simple matter to lift out the combined shell and liner with the spent coffee grounds therein. The coffee grounds may then be dumped and the combined shell and liner may be rinsed out in preparation for reuse.

A feature of the invention is the number of desirable actions that are created by the manual downward pressure of the inner container 48 that terminates the brewing operation. These actions include the following: the initial displacement of air to the atmosphere through the vent grooves 58; the subsequent closing of the vent grooves 58 to trap filtrate between the bottom of the inner container 26 and the outer bowl 25; the downward movement of the valve member 64 from its closed position to its open position; the piston-like action of the inner container 26 in spraying the trapped filtrate into the boiler receptacle 10 to precipitate condensation of steam therein for prompt creation of the vacuum; the seating of the inner container 26 against the bottom wall of the outer bowl 25 with consequent transmission of the manual downward pressure to the outer bowl to result in pressing the lower sealing ring 36 into fluidtight contact with the flared rim 22 of the boiler receptacle. If the lower flat sealing ring is the sealing ring 36a shown in FIGS. 3 and 4, a further consequence of the downward movement of the inner container is to cut off the recess 44 to completely isolate the interior of the boiler receptacle from the atmosphere.

A further feature of the invention is that the operator may simply lift the assembly shown in FIG. 1 off of the burner or may turn off the burner to permit the boiler receptacle 10 to cool down until condensation of steam therein creates such a high vacuum that the inner container 26 is forced down by atmospheric pressure to move the valve member 64 to its open position. This automatic opening of the bottom port 15 may be readily understood when it is considered that whatever pressure differential is created is effective over the cross-sectional area of the valve.

FIG. 5 shows how a shell 46a of an inner container 26a may be dimensioned to telescope into a lower cup 45a in such manner as to clamp a filter bag 80 that surrounds the shell. The filter bag 80 may be disposable along with the coffee ground therein after the shell 46a is removed from inside the filter bag.

FIGS. 6 and 7 illustrate a second embodiment of the invention in which the lower section of the brewing means comprises a diametrically positioned yoke 82 and the upper section of the brewing means that is movable relative to the lower section comprises an outer bowl 84. The bowl 84 has a thick bottom wall 85 which carries a flat sealing ring 86 that yieldingly supports the bowl by resting on the flared rim 20 of the previously described boiler receptacle 10. The bottom wall 85 of the bowl 84 slopes radially inwardly to a bottom port 87 that is controlled by suitable valve means. The bottom wall 85 has a downwardly extending skirt 88 that has diametrically positioned openings or slots 89 into which the opposite ends of the yoke 82 extend.

A cup-shaped inner container 90 nests inside the bowl 84 and clamps the peripheral portion of a filter sheet 92 against a circumferential ledge 94 of the bottom wall 85. The bottom wall of the inner container 90 has numerous perforations 95 for flow of filtrate through the filter sheet into the bottom port 87. The bottom port 87 is enlarged to provide an upper clearance space 96 and a lower annular valve seat 98, the port being formed with longitudinal grooves 100 for fluid flow beyond the valve seat into the boiler receptacle 10.

The diametrically extending yoke 82 has two angular arms 102 on its opposite ends which overhang the flared rim 20 of the boiler receptacle. The yoke 82 carries a central valve member 104 which extends upward into the bottom port 87 and which carries an annular elastomeric valve element 105 that normally rests in the valve seat 98 and thereby supports the yoke with the two angular arms 102 of the yoke spaced slightly above the flared rim 20 of the boiler receptacle. Thus the weight of the bowl 84 is normally imposed on the sealing ring 86 for sealing action thereby.

The rim of the outer bowl 84 carries an elastomeric sealing ring 106 that embraces the inner container 90 to seal off the annular space 108 between the inner container and the outer bowl.

FIG. 6 shows the parts positioned for carrying out the brewing operation with the brewing means wholly supported by the sealing ring 86. To open the valve to terminate the brewing operation, the operator depresses the upper section comprising the bowl 84 and the inner container 90 thereby flexing the sealing ring 86. The downward movement of the brewing means brings the two angular arms 102 of the yoke to bear on the flared rim 20 of the boiler receptacle and the yoke 82 then remains stationary while the downward movement of the bowl 84 continues. The continued downward movement of the valve seat 98 relative to the annular valve element 105 causes the annular valve element to snap into open position in the clearance space 96 to permit the filtrate to flow past the periphery of the valve element and through the grooves 100 into the interior of the boiler receptacle. It is apparent that the described structure in FIGS. 6 and 7 permits the second embodiment of the invention to be manipulated to carry out the previously described operating cycle.

My description in specific detail of the selected embodiments of the invention will suggest various changes, substitutions and other departures from my disclosure within the spirit and scope of the invention.

What is claimed is:

1. In an infusion device which includes a boiler receptacle and in which brewing means removably seats on the boiler receptacle in a sealing manner to contain heated liquid together with a quantity of steeping solids for a brewing operation with a filter to separate the resultant infusion from the spent solids, the brewing means having a port for flow of the filtrate into the boiler receptacle in response to the creation of a vacuum by condensation of vapor in the boiler receptacle, a normally closed valve controlling the flow of the filtrate through the port,
    the improvement comprising:
    said brewing means having a lower section and an upper section,
    one of said sections having said port,
    said upper section incorporating said filter and being constructed and arranged to contain the liquid and the steeping solids,
    said upper section being movable between a normal first position and a second position,
    said valve being responsive to the upper section to open in response to movement of the upper section from its normal first position to its second position,
    whereby manually moving the upper section from its first position to its second position opens the valve.

2. An improvement as set forth in claim 1 in which said valve comprises two cooperating valve means with freedom for relative movement between the two valve means to open and close the valve,
    one of the two valve means being unitary with said upper section,
    the other of the two valve means being unitary with the lower section.

3. An improvement as set forth in claim 2 in which said one valve means retractably extends downward from the bottom of the lower section at the open position of the valve and the valve closes in response to retraction of the one valve means,
    whereby the valve may be closed by forcing the bottom of the lower section against a support surface to retract said one valve means.

4. An improvement as set forth in claim 1 in which said valve is constructed and arranged to yieldingly remain open when it is forcibly opened and to yieldingly remain closed when it is forcibly closed.

5. An improvement as set forth in claim 4 in which said valve is constructed and arranged to open and close with snap action.

6. An improvement as set forth in claim 1 in which said valve is responsive to a pressure differential across the determined magnitude whereby the valve opens automatically if it is not opened manually before the pressure differential reaches said magnitude.

7. An improvement as set forth in claim 1 which includes an annular resilient sealing means supporting the brewing means on the boiler receptacle, said annular sealing means having one radial portion interposed between the brewing means and the boiler receptacle and having another portion extending downward into contact with the inner circumferential surface of the boiler receptacle to stabilize the sealing means.

8. An improvement as set forth in claim 7 in which said annular sealing means has a peripheral recess to localize passage of steam escaping during the brewing cycle.

9. An improvement as set forth in claim 1 in which said valve is biased to its open position;
    and in which means yieldingly retains the valve in its closed position in opposition to the bias.

10. An improvement as set forth in claim 1 in which said valve includes a valve member positioned inside said port,
    said port being shaped and dimensioned relative to the valve member to yieldingly retain the valve member in a closed position.

11. An improvement as set forth in claim 10 in which said port is restricted to form a throat to releasably hold the valve member at its closed position.

12. An improvement as set forth in claim 1:
    in which said valve comprises two cooperating valve means;
    in which one of said two valve means protrudes downward from the bottom of the lower section of the brewing means when the valve is open;
    and in which said one valve means is retractible upward to close the valve,
    whereby the open valve may be closed by forcing the bottom of the brewing means against a support surface to retract the protruding valve means.

13. An improvement as set forth in claim 1:
    in which said valve comprises a valve member surrounded by an annular valve body, said valve body forming said port,
    and in which one of said valve members and said valve body is fixed relative to the lower section of the brewing means, the other of said valve member and said valve body being movable with the upper section of the brewing means to move from an upper closed position to a downward open position in response to downward manual movement of said upper section.

14. An improvement as set forth in claim 13 in which the valve body is fixed relative to said lower section.

15. In an infusion device which includes a boiler receptacle and in which a brewing receptacle removably seats on the boiler receptacle in a sealing manner to contain heated liquid together with a quantity of steeping solids for a brewing operation with a filter to separate the resultant infusion from the spent solids, the brewing receptacle having a port for flow of the filtrate into the boiler receptacle in response to the creation of a vacuum by condensation of vapor in the boiler receptacle, a normally closed valve controlling the flow of the filtrate through the port, the improvement comprising:
said brewing receptacle being supported on the boiler receptacle with freedom for the brewing receptacle to move relative to the boiler receptacle from a normal position for carrying out a brewing operation to a second position for carrying out a filtration step,
said valve being operatively connected to the brewing receptacle to open in response to movement thereof to its second position.

16. An improvement as set forth in claim 15 which includes means forming a spacer to trap filtrate outside said filter during the brewing operation;
and in which the movement of the brewing receptacle from its first position to its second position contracts said space to inject the trapped filtrate into the boiler receptacle to condense vapor therein.

17. In an infusion device which includes an open-top boiler receptacle and in which a brewing receptacle removably seats on the boiler receptacle in a sealing manner to contain the heated liquid together with a quantity of steeping solids for a brewing operation with a filter to separate the resultant infusion from the spent solids, the brewing receptacle having a port for flow of the filtrate into the boiler receptacle in response to the creation of a vacuum by condensation of vapor in the boiler receptacle, normally closed valve controlling the flow of the filtrate through the port, the improvement comprising:
container means for the heated liquid and the steeping solids, said container means being equipped with said filter and being mounted inside the brewing receptacle with freedom for manual movement relative to the brewing receptacle between a first position and a second position,
said valve being responsive to said container means to open in response to manual movement of the container means relative to the brewing receptacle from its first position to its second position.

18. An improvement as set forth in claim 17 which includes annular sealing means effective between the brewing receptacle and the container means to prevent leakage of air from the atmosphere past the periphery of the container means into said port when the container means is at its second position.

19. An improvement as set forth in claim 17 in which said container means and the brewing receptacle define an annular space;
which includes annular sealing means to cut off said space from the atmosphere;
and which includes normally open vent means to place the annular space in communication with the atmosphere,
said vent means being responsive to movement of the container means to close in response to movement of the container means from its first position to its second position.

20. An improvement as set forth in claim 17:
in which the container means moves downward to open the valve;
and in which the container means has an upper part and a lower part with said filter gripped between the two parts whereby the application of downward manual force to the container means tightens its grip on the filter.

21. An improvement as set forth in claim 17 in which one of said container means and said brewing receptacle carries an annular sealing means in contact with the surface of the other of said container means and brewing receptacle to seal the annular space therebetween;
in which the container means moves downward from its first position to its second position thereby causing said sealing means to shift along said surface from a first position to a second position;
said surface having at least one recess bypassing the sealing means at the first position of the sealing means to vent said annular space during during the brewing operation,
said recess being spaced from the sealing means at the second position of the sealing means to cut off the annular space from the atmosphere,
whereby the application of downward force to move said container means downward not only opens the valve but also cuts off the annular space from the atmosphere.

22. An improvement as set forth in claim 21 which includes a second annular resilient sealing means supporting the brewing receptacle on the boiler receptacle whereby the application of manual force also places said second sealing means under pressure to increase its sealing effectiveness.

23. An improvement as set forth in claim 22 in which the second annular sealing means has a peripheral recess to form a normally closed vent passage for escape of steam from the boiler receptacle to the atmosphere during the brewing operation;
said recess being shaped, dimensioned and located to provide a local path of least resistance that opens in response to the creation of a pressure differential across the recess.

24. An improvement as set forth in claim 22:
which includes means forming a space to trap filtrate outside said filter while the valve is closed;
and in which the manual downward movement of the container means contracts said space to inject the trapped filtrate into the boiler receptacle to condense vapor therein.

25. An improvement as set forth in claim 24:
in which the container means has an upper part and a lower part with said filter gripped between the two parts whereby the application of downward manual force to the container means tightens its grip on the filter.

26. An improvement as set forth in claim 25:
which includes a resilient annular seal effective between the brewing receptacle and the boiler receptacle to normally support the brewing receptacle at a first normal position elevated above the boiler,
said annular seal being yieldable to permit the brewing receptacle to be manually depressed to open said valve.

27. An improvement as set forth in claim 26:
in which said valve comprises two valve means in the form of a valve member and a valve body surrounding the valve member,
a first of said valve means being unitary with the brewing receptacle and normally elevated relative to the second of said valve means, at which elevated position the valve is closed,
said boiler receptacle being cooperative with the second valve means to determine a lower limit position thereof towards which the first valve means is moved by the brewing receptacle to open the valve.

28. An improvement as set forth in claim 27:
in which said second valve means rests on the boiler receptacle at said lower limit position;
and in which said first valve means normally supports the second valve means out of contact with the boiler receptacle at the closed position of the valve to place all of the weight of the brewing receptacle on said annular seal,
whereby the downward manual movement of the brewing receptacle to open the valve results initially in downward movement of the two valve means in unison with the valve closed until the second valve means stops at its lower limit position and then results in downward movement of the first valve means relative to the second valve means to open the valve.

29. In an infusion device wherein an open-top boiler receptacle is provided to heat a liquid and brewing means removably seats on the boiler receptacle in a sealing manner to contain heated liquid together with a quantity of stepping solids for a brewing operation with a filter to separate the resultant infusion from the spent solids, the brewing means having a port for flow of the filtrate into the boiler receptacle in response to the creation of a vacuum by condensation of vapor in the boiler receptacle, a valve controlling the flow of the filtrate through the port, the improvement comprising:
container means removably mounted in said brewing means to hold the heated liquid together with the steeping solids, said container means and brewing receptacle defining an annular space around the container means; and
which includes annular sealing means to cut off said annular space from the atmosphere after the brewing operation.

30. An improvement as set forth in claim 29 in which one of said annular sealing means and said container means is manually deformable to vent the annular space to the atmosphere.

31. An improvement as set forth in claim 29 in which said container means has two parts cooperative with each other to anchor said filter.

32. An improvement as set forth in claim 31 in which one of the two parts has a perforated bottom wall;
and in which said filter rests on said bottom wall.

33. An improvement as set forth in claim 32 in which the outer of said two telescoping parts is cup-shaped with an upwardly extending peripheral wall;
in which said filter has a bottom wall and an upwardly extending peripheral wall;
and in which the inner of the two telescoping parts clamps the peripheral wall of the filter aaginst the inner surface of the peripheral wall of the outer of the two telescoping parts.

34. An improvement as set forth in claim 33 in which said filter is a bag enclosing the inner of the two telescoping parts.

35. An improvement as set forth in claim 31 in which said filter is a disposable member.

36. An improvement as set forth in claim 31 in which one of the two parts has a perforated bottom wall and an upwardly extending peripheral wall;
and in which the other of the two parts clamps the filter against the bottom wall of said one of the two parts.

37. An improvement as set forth in claim 29 in which said filter and the container means are disposable members.

38. An improvement as set forth in claim 17 which includes normally open means to vent said annular space to the atmosphere during the brewing operation,
said venting means being responsive to the movement of said container means to close when the movement of the container means closes said valve to terminate the brewing operation.

39. In an infusion device wherein an open-top boiler receptacle is provided to heat a liquid and in which brewing means removably seats on the boiler receptacle in a sealing manner to contain heated liquid together with a quantity of steeping solids for a brewing operation with a filter to separate the resultant infusion from the spent solids, the brewing means having a port for flow of the filtrate into the boiler receptacle in response to the creation of a vacuum by condensation of vapor in the boiler receptacle, a valve controlling the flow of the filtrate through the port,
the improvement comprising:
means to trap filtrate in a space in the brewing means outside the filter during the brewing operation; and
means to open said valve and at the same time contract said space to inject the trapped filtrate into the boiler receptacle to condense vapor therein.

References Cited

UNITED STATES PATENTS

| | | | |
|---|---|---|---|
| 1,838,206 | 12/1931 | Alaj | 99—306 |
| 2,298,854 | 10/1942 | Wolcott | 99—313 |
| 2,401,529 | 6/1946 | Varney | 99—276 |
| 2,621,581 | 12/1952 | Varney | 99—302 |
| 3,060,836 | 10/1962 | Varney | 99—302 |

ROBERT W. JENKINS, Primary Examiner